(12) United States Patent
Downie et al.

(10) Patent No.: US 10,605,389 B2
(45) Date of Patent: Mar. 31, 2020

(54) MAGNETIC FILTER FOR A CENTRAL HEATING SYSTEM

(71) Applicant: ADEY HOLDINGS (2008) LIMITED, Cheltenham, Gloucestershire (GB)

(72) Inventors: Simon Downie, Cheltenham (GB); Kashem Pathan, Worcester (GB)

(73) Assignee: ADEY HOLDINGS (2008) LIMITED, Cheltenham, Gloucestershire (GB)

(*) Notice: Subject to any disclaimer, the term of this patent is extended or adjusted under 35 U.S.C. 154(b) by 253 days.

(21) Appl. No.: 15/552,271

(22) PCT Filed: Jan. 28, 2016

(86) PCT No.: PCT/GB2016/050186
§ 371 (c)(1),
(2) Date: Aug. 19, 2017

(87) PCT Pub. No.: WO2016/132095
PCT Pub. Date: Aug. 25, 2016

(65) Prior Publication Data
US 2018/0345185 A1 Dec. 6, 2018

(30) Foreign Application Priority Data
Feb. 19, 2015 (GB) .................................. 1502756.8
Nov. 30, 2015 (GB) .................................. 1521054.5

(51) Int. Cl.
*F16L 27/12* (2006.01)
*B01D 21/00* (2006.01)
(Continued)

(52) U.S. Cl.
CPC .......... *F16L 27/12* (2013.01); *B01D 21/0009* (2013.01); *B01D 21/2411* (2013.01);
(Continued)

(58) Field of Classification Search
CPC .. B01D 35/06; B01D 2221/02; B01D 21/267; B01D 21/2411; B01D 21/0009;
(Continued)

(56) References Cited

U.S. PATENT DOCUMENTS 3,224,585 A * 12/1965 Scavuzzo ............... B01D 35/14
210/136
4,877,521 A * 10/1989 Petrucci ............... B01D 24/105
210/171
(Continued)

FOREIGN PATENT DOCUMENTS

CA 1135747 A 11/1982
CN 201496693 U 6/2010
(Continued)

*Primary Examiner* — Claire A Norris
*Assistant Examiner* — Ekandra S. Miller-Cruz
(74) *Attorney, Agent, or Firm* — Michael E. Dockins; Shumaker, Loop & Kendrick, LLP

(57) ABSTRACT

A magnetic filter (10) includes first and second separation chambers (10, 12). The separation chambers (10, 12) each have an inlet and an outlet, and the separation chambers (10, 12) are joined together such that the inlets of the first and second chambers are adjacent, and the outlets of the first and second chambers are adjacent. An inlet port arrangement (28) connects both inlets to a single inlet pipe, and an outlet port arrangement (30) connects both outlets to a single outlet pipe.

20 Claims, 6 Drawing Sheets

(51) Int. Cl.
  *B01D 35/06* (2006.01)
  *B03C 1/28* (2006.01)
  *B01D 21/24* (2006.01)
  *B01D 21/26* (2006.01)
  *B03C 1/033* (2006.01)

(52) U.S. Cl.
  CPC ............ *B01D 35/06* (2013.01); *F16L 27/125* (2013.01); *B01D 21/267* (2013.01); *B01D 2221/02* (2013.01); *B03C 1/0332* (2013.01); *B03C 1/286* (2013.01); *B03C 2201/18* (2013.01); *B03C 2201/28* (2013.01)

(58) Field of Classification Search
  CPC ......... F16L 27/12; F16L 27/125; F28F 19/01; F24H 9/0005; F24H 9/0047; F24D 19/0092; B03C 2201/28; B03C 2201/18; B03C 1/0332; B03C 1/286
  USPC ........................................................ 210/222
  See application file for complete search history.

(56) References Cited

U.S. PATENT DOCUMENTS

| | | | | |
|---|---|---|---|---|
| 6,223,555 | B1* | 5/2001 | Schroeder | F25B 43/006 62/474 |
| 6,287,464 | B1* | 9/2001 | Gu | B01D 29/21 210/179 |
| 6,524,476 | B1 | 2/2003 | Caiozza | |
| 2004/0182769 | A1 | 9/2004 | Fogel | |
| 2012/0198970 | A1* | 8/2012 | Robidoux | B01D 35/31 81/121.1 |
| 2013/0026041 | A1* | 1/2013 | Huh | B03C 1/288 204/661 |
| 2014/0183119 | A1* | 7/2014 | Brown | B01D 35/30 210/238 |
| 2014/0367340 | A1* | 12/2014 | Caleffi | B03C 1/288 210/695 |

FOREIGN PATENT DOCUMENTS

| | | | |
|---|---|---|---|
| CN | 202091683 U | 12/2011 | |
| CN | 203309421 U | 11/2013 | |
| CN | 104321120 A | 1/2015 | |
| DE | 19711074 A1 | 9/1998 | |
| FR | 2258602 A1 | 8/1975 | |
| FR | 2306716 A1 | 11/1976 | |
| GB | 2242247 A | 9/1991 | |
| GB | 2476825 A | 7/2011 | |
| GB | 2491246 A | 11/2012 | |
| GB | 2500908 A | 10/2013 | |
| GB | 2518162 A | 3/2015 | |
| WO | WO-2007031984 A1 * | 3/2007 | ............ B01D 35/06 |
| WO | 2012073029 A1 | 6/2012 | |

* cited by examiner

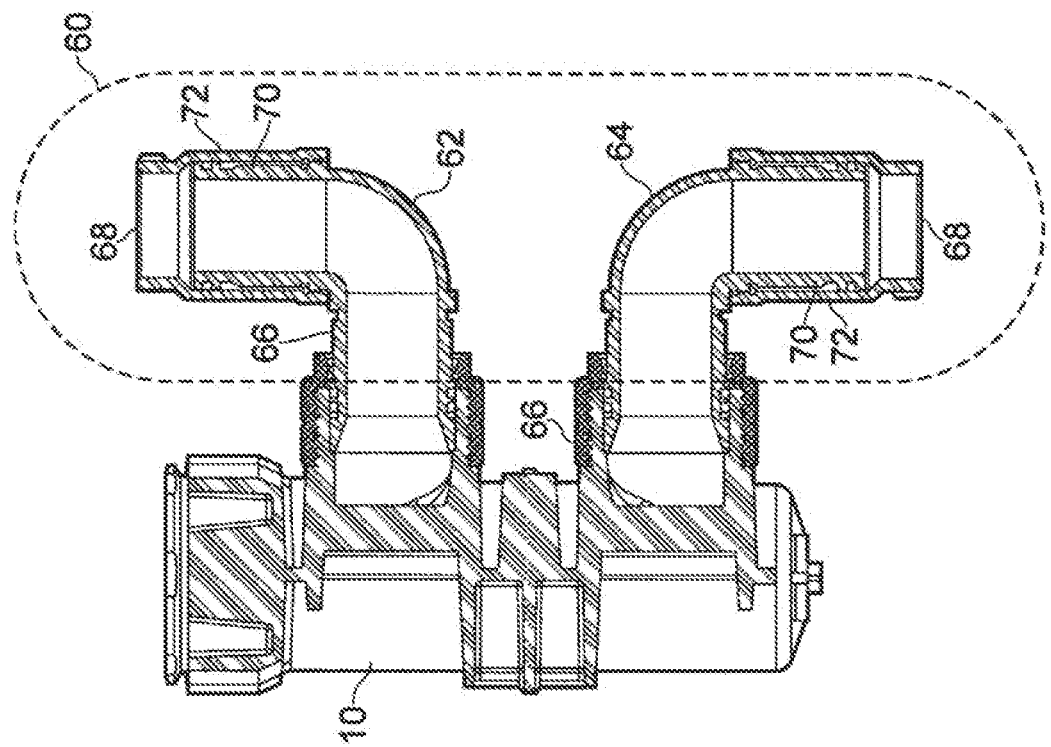
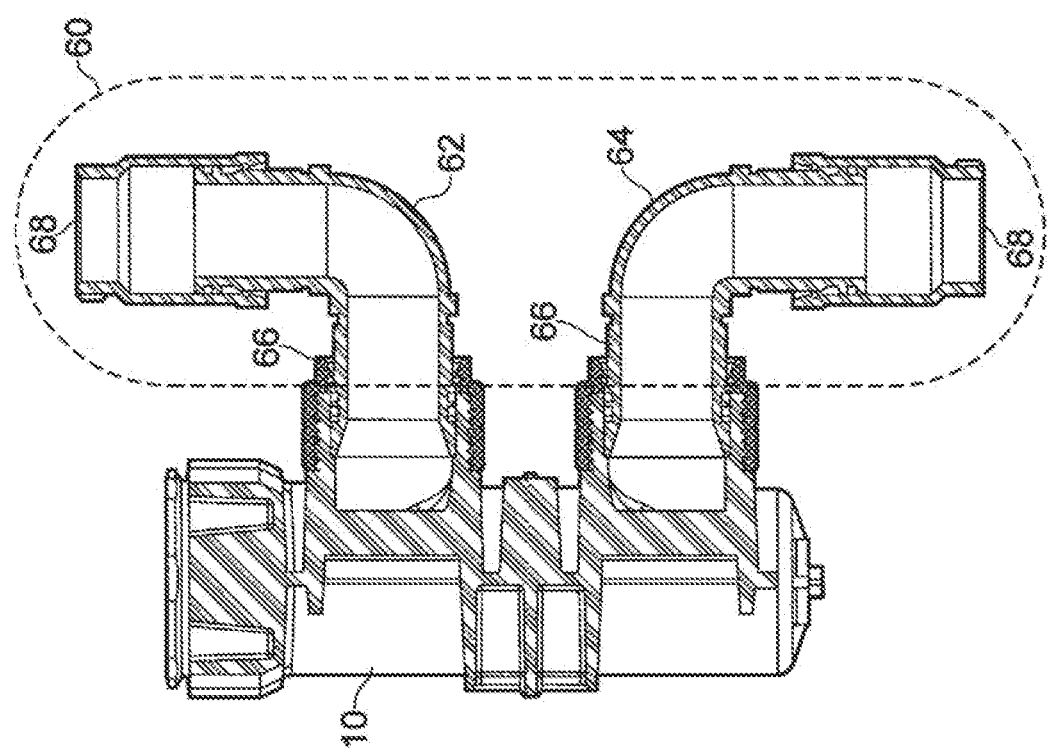

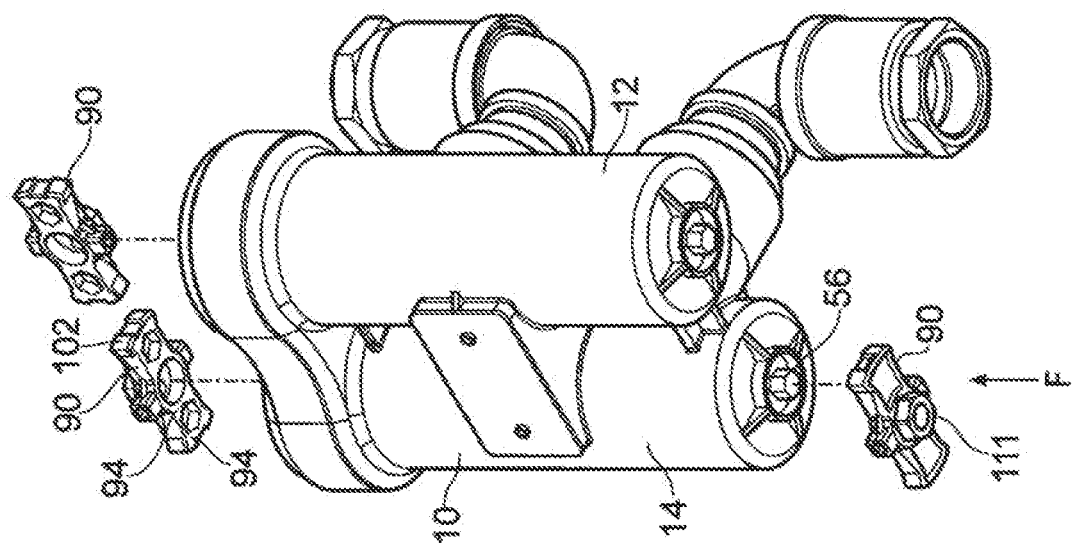
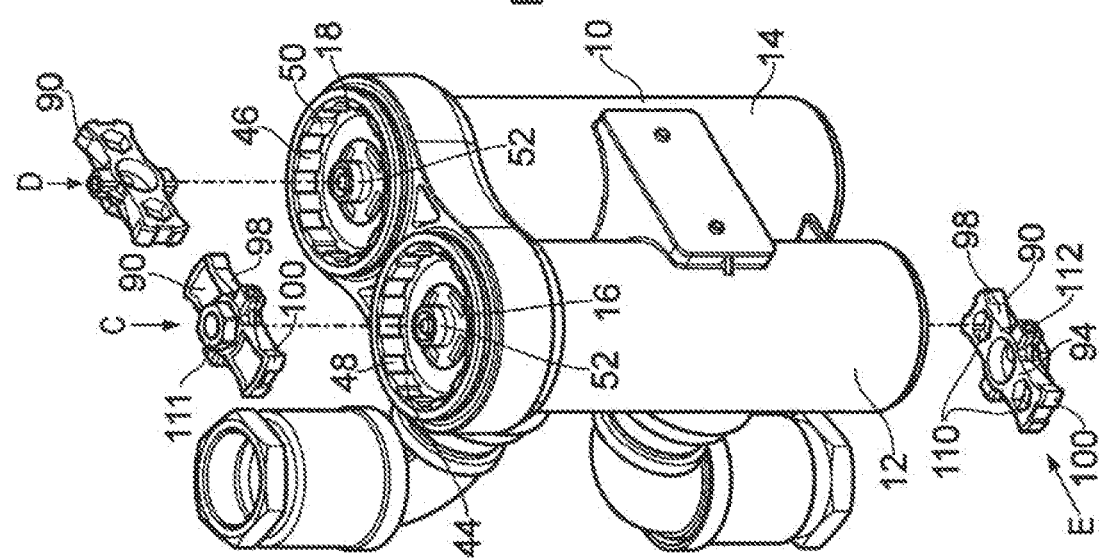

MAGNETIC FILTER FOR A CENTRAL HEATING SYSTEM

CROSS-REFERENCE TO RELATED APPLICATION

This application claims the benefit of priority of international application Serial No. PCT/GB2016/050186 filed on Jan. 28, 2016 hereby incorporated herein by reference in its entirety which claims the benefit of GB1502756.8 filed on Feb. 19, 2015 and GB1521054.5 filed on Nov. 30, 2015, each of which is incorporated herein by reference in its entirety.

The present invention relates to a magnetic filter for a central heating system, and in particular to a filter for use in a system having pipework with diameter between around 35 and 42 mm.

BACKGROUND TO THE INVENTION

It is now common to fit filter devices to central heating systems, to remove magnetic and non-magnetic particles from the system water as it circulates around the system. Such filters are useful in all types of central heating system, from small domestic systems with a single circuit and a few radiators, to the largest systems in factories and other industrial sites.

At present, filters are available for domestic systems, which typically use 22 mm or 28 mm copper pipe for the main heating circuit(s). These filters typically have a body made from plastics, for example, glass-reinforced nylon. Various features are known which provide for easy and compact installation in a domestic setting. For example, the Applicant's co-pending application published as GB2502383 discloses an in-line fitment for a filter which includes two sockets, one socket having a greater pipe receiving depth than the other socket. Where some manipulation of the pipework is possible, this provides for easy attachment of the fitment to the heating circuit, where the parts of the fitment which attach to the filter are guaranteed to be at exactly the correct spacing for attachment of the filter.

Filters are also available for larger systems, which use 2 inch (around 50 mm) or greater diameter pipe for the heating circuit(s). For example, the filters sold under the trade mark "Magnaclean (RTM) Commercial" fit into this category. These filters are essentially in the form of a large, heavy, cast container, with an inlet and an outlet on either side, a removable lid, and magnets extending into the container to attract and retain magnetic particles from system water as it flows through the filter. These large filters are typically connected into the heating circuit by providing a welded flange on the inlet and outlet of the filter. A similar flange can be welded onto the pipe ends to be connected, and each pipe flange is then bolted to its corresponding filter flange, some sealing material having been placed in between.

However, there is a class of medium-sized central heating systems for which neither of these types of filters are particularly well suited. These systems typically use steel pipe, between 35 mm and 42 mm in diameter. The pipes are usually joined either by tapered threads, which are typically made as required using a die, or by crimping, for example using the "XPRESS" (RTM) crimping system. These pipes are inflexible, which makes it impossible to use the in-line fitment as described in GB2502383. Also, the size of the tools used, and the forces typically applied to pipework during installation of these systems, makes damage to a plastic-bodied filter likely. However, large filters such as the Magnaclean (RTM) Commercial are expensive to manufacture, and rather over-specified in terms of the system pressure and flow rate which is typical in medium-sized (35-42 mm) systems.

It is an object of this invention to provide a magnetic filter which is suitable for use in these medium-sized central heating systems.

STATEMENT OF INVENTION

According to a first aspect of the present invention, there is provided a telescopic fitment for connection of a magnetic filter into a central heating system circuit, the telescopic fitment including a first connector and a second connector, each of the first and second connectors including a filter connection end for connecting with the magnetic filter and a circuit connection end for connecting with the central heating system circuit, at least one of the first and second connectors including an inner pipe and an outer pipe, the filter connection end being provided on one of the inner or outer pipes and the circuit connection end being provided on the other of the inner or outer pipes, the inner pipe being slideable within the outer pipe for adjusting the position of the circuit connection end with respect to the filter connection end, whilst maintaining a sealed fluid path between the circuit connection end and the filter connection end.

The telescopic fitment is especially well-suited for use with pipework having a diameter between around 35 mm and 42 mm. This pipework is typically joined by the use of a tapered male thread which mates with a straight female thread. The circuit connection end may be provided with a straight female thread, and may be then tightened onto a tapered thread on the end of a pipe which forms part of the heating circuit. As the threads are tightened, the circuit connection end will move slightly along the tapered thread of the pipe. At some point, the connection will be tight enough to form a seal. The other connector, which may include a similar telescopic arrangement, may be tightened onto another pipe in exactly the same way. Because the connectors are telescopically adjustable, the fitment can be connected to pipework having a range of relative distances and positions between the two connections to the heating circuit. Also, the tapered thread connection method as described above may be used, without having to predict precisely how far along the tapered thread the joint will tighten and seal.

35-42 mm diameter pipes are typically made from steel, and are very inflexible. The telescopic fitment therefore provides a similar level of flexibility in terms of positioning and alignment as is typically achievable in smaller (e.g. 22 mm copper) systems, where there is normally some movability in an unconnected pipe end.

The circuit connection end may be provided on the outer pipe and the filter connection end may be provided on the inner pipe.

At least one of the outer and inner pipes may be substantially in the form of a 90 degree elbow. Magnetic filters typically have ports which extend parallel to each other, and yet they are usually to be fitted essentially to a single straight pipe where a section has been cut out to accommodate the filter. In other words, magnetic filters are usually attached to pipe ends which are facing each other, in-line with each other.

Nevertheless filters in some cases need to be fitted to two parallel pipes, or to pipe ends at various angles relative to each other. It is therefore envisaged that the fitment of the invention may be provided in a range of alternatives to accommodate these requirements.

An O-ring seal may be provided between the inner and outer pipes of the or each telescopic connector. Preferably, two O-ring seals are provided to ensure a leak-proof join.

The O-ring seal(s) may be provided in groove(s) on the inner pipe, and the outer pipe may have a substantially smooth inside wall at the point where it meets the seal in use.

A stop may be provided between the inner and outer pipes, to prevent the outer pipe from sliding off the inner pipe and detaching. Where an O-ring or double O-ring seal is provided, the stop may prevent the outer pipe from sliding to a point where the seal is no longer between the two pipes.

Preferably, the stop is in the form of a snap ring which is held within a groove extending around the interior of the end of the outer pipe, and a first circumferential detent on the exterior wall of the inner pipe. The snap ring, when held in its groove, forms a circumferential bulge on the interior wall of the inner pipe, and the first detent on the inner pipe obstructs that bulge and prevents the outer pipe from moving past the detent.

The use of the snap ring to form part of the stop is particularly advantageous, because it allows for easy assembly of the telescopic-fitting. A snap-ring assembly groove may be provided on the exterior wall of the inner pipe, further inward (that is, away from the end of the inner pipe over which the outer pipe is slid) than the first detent. Just inward of the snap-ring assembly groove, an extension may be provided around the external wall of the inner pipe which forms a second detent.

The outer pipe preferably has a tapered interior wall at the end which is to be slid over the inner pipe, giving that end of the outer pipe a mouth which is slightly wider than the diameter of the rest of the outer pipe. The groove within which the snap ring is held is preferably located just inward (i.e. in the direction away from the end which is slid over the inner pipe) of the tapered mouth.

To assemble the connector, firstly a metal snap ring may be placed around the inner pipe, either over the snap-ring assembly groove or over the inner pipe at any position between the first detent and the soap-ring assembly groove. The outer pipe may then be slid over the inner pipe, past the seals. The tapered mouth of the outer pipe will slide over the snap ring, and the snap ring will then be carried with the outer pipe until it reaches the snap-ring assembly groove. When the snap ring is located over the snap-ring assembly groove, the outer pipe can continue to be pushed a short distance further onto the inner pipe. As it is, the tapered mouth will start to compress the snap-ring into the snap-ring assembly groove, until the outer pipe has moved to the point where the snap-ring holding groove on the outer pipe is level with the snap-ring assembly groove on the inner pipe. At this point, the snap-ring will expand into the snap-ring holding groove, and the outer pipe can be extended back out, carrying the snap ring with it.

At this stage, the telescopic connector is assembled, and cannot easily be disassembled, since there is no way of removing the snap-ring from within the snap-ring holding groove. The snap-ring effectively becomes a permanent part of the outer pipe, and prevents the outer pipe from moving past the point where the snap-ring is obstructed by the first detent on the inner pipe.

Note that, after assembly, the snap-ring assembly groove serves essentially no further purpose.

The filter connection end of each connector may include an arrangement whereby part of the connector is received within an inlet/outlet port of the magnetic filter, and a threaded ring is provided which can be tightened by hand to retain the connector in attachment with the magnetic filter. Such an arrangement is disclosed in the Applicant's co-pending British patent application No. 1404432.5, which is incorporated herein by reference.

The fitment may be provided with a magnetic filter, the magnetic filter including inlet and outlet ports which extend from the filter substantially parallel with each other. The inlet and outlet ports may be externally screw-threaded for connection with the filter connection ends of the connectors, as described above.

Typically, the connectors of the fitment are substantially 90 degree elbows, and when the filter connection ends are attached to the parallel inlet and outlet ports of the filter the connectors can be configured so that their circuit connection ends face away from each other, and are disposed along the same line. The telescopic arrangement as described may be provided substantially on the circuit connection ends of the connectors, so that the distance between the circuit connection ends of the connectors is adjustable when they are connected to the filter as described. The filter may then be installed on a straight pipe by cutting a section out of the pipe, and then adjusting the telescoping components of the connectors so that the fitment is exactly the right size to fit the length of pipe which has been removed. The circuit connection ends of the connectors may be internally screw threaded, in which case they may be connected into the circuit by cutting a tapered thread into the ends of the heating circuit pipes with a die tool, and then screwing the circuit connection ends of the connectors onto the tapered threads. Alternatively, the circuit connection ends of the connectors may be crimped into the central heating circuit, for example using the XPRESS (RTM) crimping system.

According to a second aspect of the invention, there is provided a filter for a central heating system, the filter including at least one separation chamber and a screw-top closure for closing an opening in the separation chamber, the screw-top closure having a circumferential wall, and the circumferential wall being provided with castellations around an interior side of the wall for engaging with a handle member which can be placed across the screw-top, between opposing sides of the interior wall, to allow the screw-top closure to be turned by hand.

A screw-top closure or lid having interior castellations for engagement with a handle is advantageous in a filter for a medium-sized (35-42 mm) heating system, because it allows the body and closure of the separation chamber to be made from plastics, for example glass-reinforced nylon, while mitigating the risk of overtightening, which can damage threads and seals. Overtightening is a particular risk when installing or modifying systems of this size, because the tools used on other parts of the system tend to be heavy-duty, for use on steel pipe. However, the screw-top lid with interior castellations can be contracted in a way which makes it impossible to engage an ordinary spanner. The installer must therefore use the provided handle, which is designed to be operated by hand or by relatively small tools (for example a 22 mm spanner or socket wrench) so that the lid is closed with the correct torque.

Preferably, an exterior thread is provided on the outside of the circumferential wall, opposite the castellations. The thread may extend substantially to the top of the wall, so that when the screw-top is screwed into the separation chamber there is little or no protrusion of the lid above the top of the chamber. This prevents the lid from being forced with a spanner or similar tool. However, a lip may be provided, extending outwardly from the top of the circumferential wall. The lip may act as a stop to prevent the lid from being screwed too far into the separation chamber, and may sit against an edge of a wall of the separation chamber when the lid is screwed into the chamber.

A positioning aid may be provided substantially at the centre of the lid, extending from the lid in the same direction as the circumferential wall. The positioning aid may be in the form of a substantially circular protrusion, for engaging with a corresponding circular indent in the provided handle. The handle may therefore be oriented in substantially any direction across the centre of the lid, subject to it engaging with castellations on opposite sides of the circumferential wall. The castellations are preferably equally spaced substantially all the way around the interior surface of the circumferential wall.

The positioning aid may be part of a bleed valve or other fitting which may be usefully provided in the lid.

The filter may be provided with a handle member in the form of an elongate body, having a top side, a bottom side and two opposing end faces, and engagement means on each end face for engaging, with the castellations on the wall of the lid. The engagement means may be in the form of rectangular cut-outs in each end face of the handle member, which extend to at least one edge of each respective end face. That is, the rectangular cut-outs are open at at least one of the top side and the bottom side of the handle body. Preferably, the elongate cut-outs do not extend as far as the opposite edge of each respective face, so that the cut-outs are closed at one of the top side and the bottom side of the handle body. Effectively this means that, in use, part of the elongate handle will sit on top of the castellations of the lid, and part of the handle will extend between the castellations.

The handle member may include an indent substantially at the centre of one side of the body, for fitting over a positioning aid as described above. Preferably, the indent is substantially circular. Preferably, the indent is on one of the top and bottom sides, and extends only part way towards the other side, although in some embodiments the indent may be in the form of a through-hole, from one side of the handle body to the other.

Although it is envisaged that the handle member will usually be turned by hand, engagement means for engaging a spanner or socket wrench may be provided. The engagement means may be sized to fit a suitable spanner or wrench, for example 22 mm between flats, which is likely to have a short enough handle that damage due to overtightening is unlikely. The engagement means provide the option of using a spanner for extra leverage when loosening the closure, if it has become tight over time. However, the types of tools which can be used are restricted by the size of the engagement means, and the arrangement still serves to discourage use of very large tools which could cause damage by overtightening.

A socket for engaging a nut or bolt head may be provided on one of the top and bottom sides of the handle body, preferably on the same side of the body as the positioning indent and preferably between the positioning indent and the end of the handle. In some embodiments, two sockets may be provided, one on either side of the positioning indent. Where two sockets are provided, they may be identical or they may be different shapes or sizes for engaging different nuts and bolts. It is also possible to provide sockets on both sides of the handle body, so that three or four different sockets might be provided in total.

The filter may be provided with a drain valve on a bottom end of the separation chamber, and the drain valve may be closed by a drain plug in the form of a bolt which is sized to be operated by engaging the socket of the handle member.

The handles member may have left and right side faces which extend between the top and bottom faces, and also between the two end faces. A further socket may be provided on at least one, or preferably both, of the left and right side faces. The further socket in some embodiments is a square socket, as is typical for operating bleed valves. A bleed valve may be provided on the lid of the separator, and may be sized to fit the further socket on the handle.

According to a third aspect of the invention, there is provided a magnetic filter for a central heating system, the magnetic filter including:

a first separation chamber having an inlet and an outlet, and a magnet disposed within the separation chamber, a second separation chamber having an inlet and an outlet, and a magnet disposed within the separation chamber, the first and second separation chambers being joined together, the inlet of the first separation chamber being disposed adjacent the inlet of the second separation chamber, and the outlet of the first separation chamber being disposed adjacent the outlet of the second separation chamber, and the magnetic filter further including an inlet port arrangement for fluidly connecting the inlets of the first and second separation chambers to a single inlet pipe, and an outlet port arrangement for fluidly connecting the outlets of the first and second separation chambers to a single outlet pipe.

The arrangement of the invention may be used to provide for a larger capacity filter, which is simple to fit and has the advantages of smaller filters which are used in domestic or small commercial systems, for example the filter disclosed in GB1404432.5. The filter can be made from plastics, for example glass-reinforced nylon, whilst providing a large enough dirt-capturing capacity and a small enough pressure drop to be suitable for use in 32-42 mm systems.

Preferably, each of the first and second separation chambers is substantially in the form of a cylinder having circular or elliptic cross-section. The magnet may be provided substantially in the centre of the cylinder, so that water to be cleaned may flow around the magnet on all sides. The inlet of each of the first and second separation chambers is preferably in the curved wall of the cylinder, and the inlet arrangement preferably fluidly connects to each inlet substantially at a tangent to the curved wall. In other words, the inlet arrangement extends away from each separation chamber in a direction substantially in-line with the wall of the separation chamber, at the point where the inlet arrangement meets the curved wall.

Similarly, the outlet of each of the first and second separation chambers is preferably in the curved wall of the cylinder, and the outlet arrangement likewise may connect with each outlet substantially at a tangent to the curved wall.

Having fluid flow into the separation chamber at a tangent causes a swirl of flow within the separation chamber, which increases the effectiveness of separation. At the same time, providing two separation chambers next to each other means that a single inlet port arrangement and outlet port arrangement may be provided for the whole filter, and the inlet port arrangement may be disposed substantially in-line with the outlet port arrangement, which provides for easy connection of the inlet and outlet port arrangements into pipework.

The inlet port arrangement and outlet port arrangement may each include a substantially Y-shaped flow path, for splitting the flow from the inlet port into two flow paths, one directed to each separation chamber, and for combining the flow from the outlet of each separation chamber into a single outlet port. The inlet and outlet ports may be externally screw-threaded for connection to the fitment of the first aspect of the invention.

DESCRIPTION OF THE DRAWINGS

For a better understanding of the present invention, and to show more clearly how it may be carried into effect, reference will now be made by way of example only to the accompanying drawings, in which:

FIGS. 3a and 3b are cross-sections through the magnetic filter and fitment of FIG. 1, showing the telescopic fitment in respectively fully-extended and fully-retracted positions;

FIG. 4 is a magnified cross-section of part of the telescopic fitment as shown in FIG. 3a;

FIGS. 6a and 6b are perspective views of the filter and fitment of FIG. 1, shown together with the handle member of FIG. 5 in various positions.

DESCRIPTION OF A PREFERRED EMBODIMENT

Figure 1:
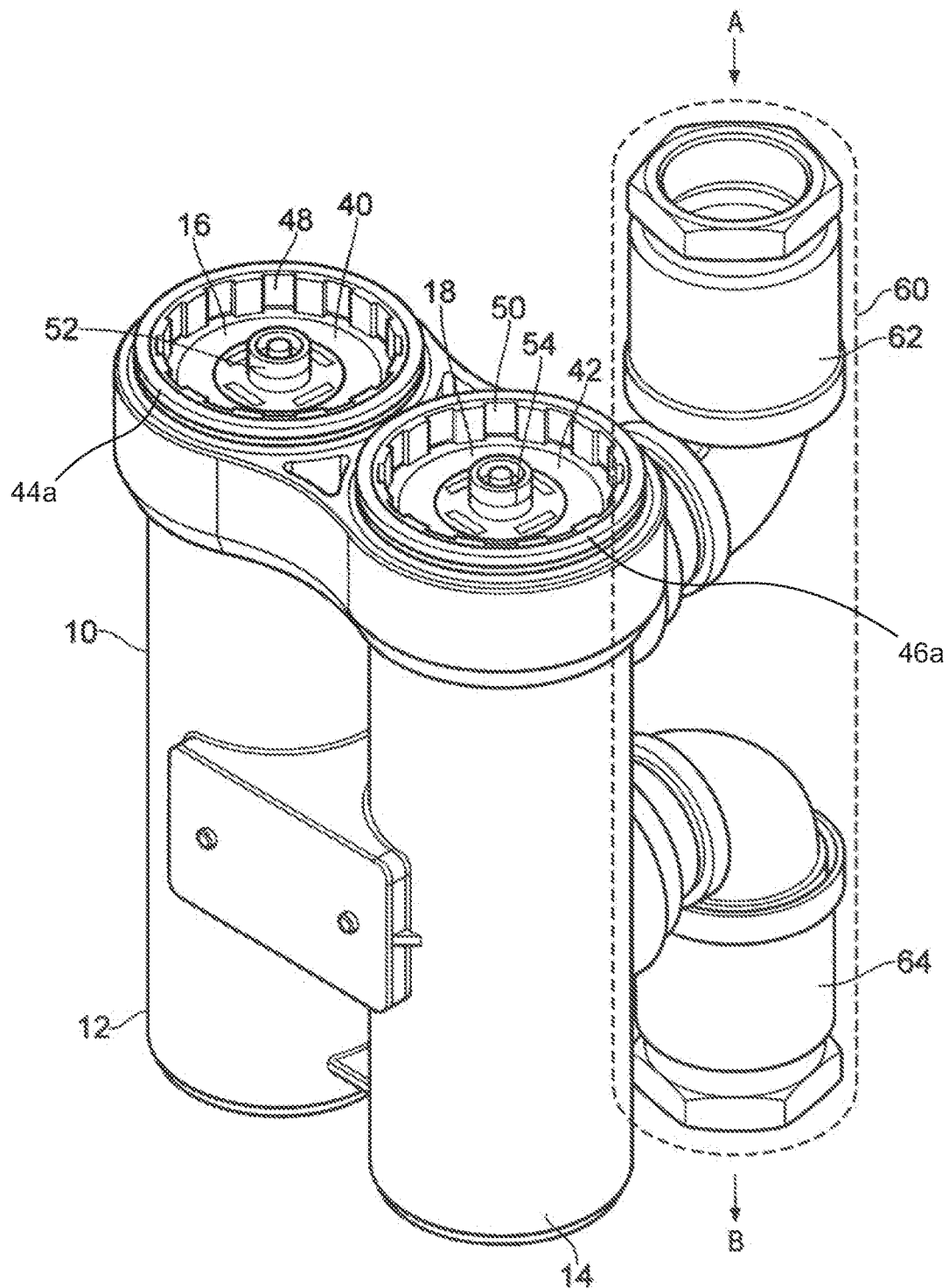
FIG. 1 is a perspective view of a magnetic filter in accordance with the second and third aspects of the invention, provided with a telescopic fitment in accordance with the first aspect of the invention.
Figure 2:
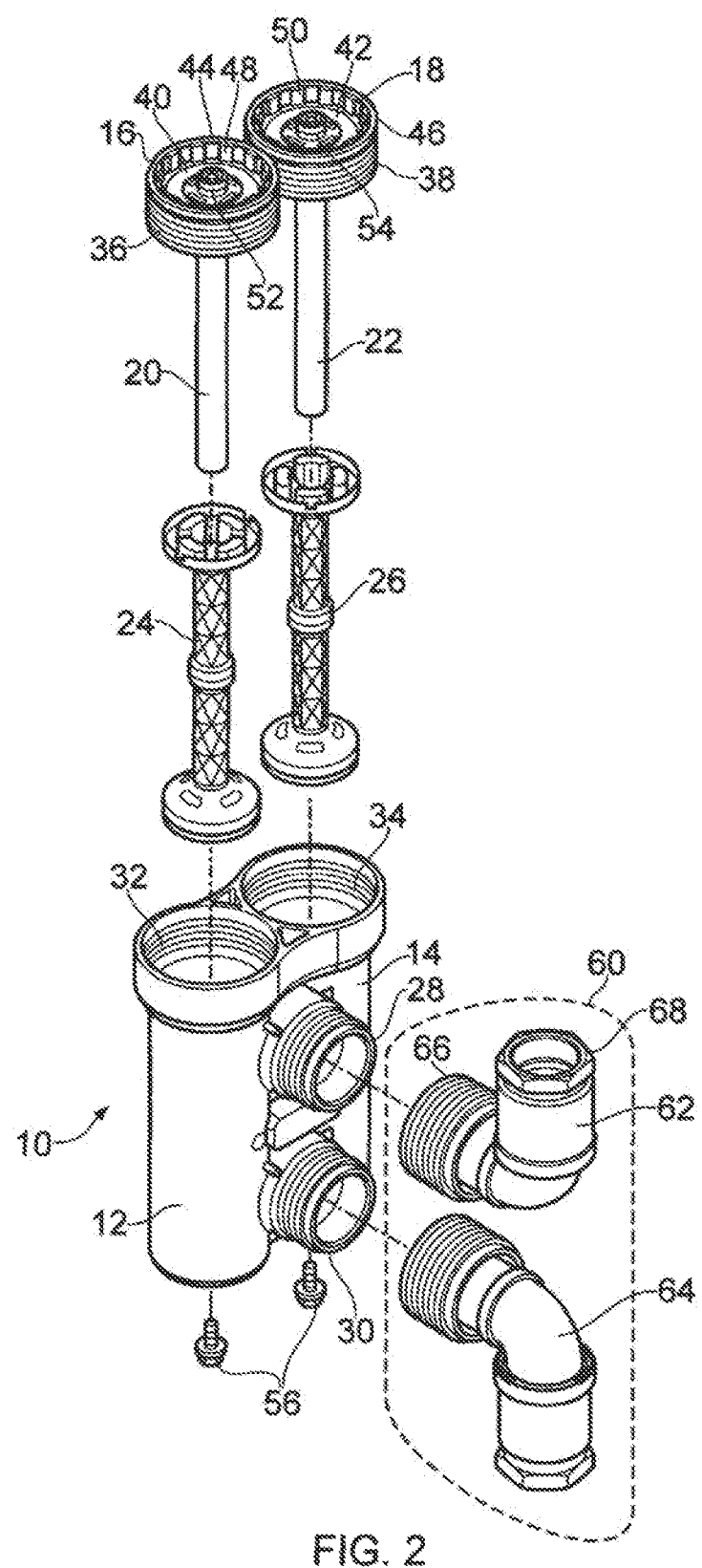
FIG. 2 is an exploded perspective view of the magnetic filter and fitment of FIG. 1.

Referring firstly to FIGS. 1 and 2, a magnetic filter for a central heating system is indicated generally at 10, and is shown with a fitment 60.

The magnetic filter includes first and second substantially cylindrical separation chambers 12, 14. Each chamber is open at one end (uppermost in FIG. 1), but the open end of each separation chamber 12, 14 is closed by a closure 16, 18. In FIG. 1 the closures 16, 18 are shown folly fitted onto the separation chambers 12, 14. In other words, the magnetic filter 10 is shown closed, as it would be when installed in a central heating system and in normal use.

As best seen in FIG. 2, magnets 20, 22 extend into each of the separation chambers 12, 14. The magnets 20, 22 are fixed to the closures 16, 18 and are enclosed in use by sleeves 24, 26. The arrangement of a magnet attached to a closure, and the sleeves themselves, are described in detail in co-pending application GB1404432.5, which is incorporated herein by reference.

An inlet port arrangement 28 and outlet port arrangement 30 are provided, between the first and second separation chambers 12, 14. The first and second separation chambers 12, 14 are disposed next to each other and are joined to each other, and the inlet and outlet port arrangements are provided between the two separation chambers. The two separation chambers 12, 14, and the inlet and outlet port arrangements 28, 30 are moulded from glass-reinforced nylon in a single piece.

The inlet and outlet port arrangements 28, 30 are externally screw-threaded.

Each closure 16, 18 is in the form of a substantially planar roof section 40, 42, and a circumferential wall 44, 46 extending from the roof section. A lip 44a, 46a is provided on each screw-top closure 16, 18. The lip 44a, 46a extends outwardly from a top of the circumferential wall 44, 46. An external screw thread 36, 38 is provided on the outside of each circumferential wall 44, 46, and castellations 40, 50 are provided on the inside of the wall. The castellations 48, 50 extend substantially radially and inwardly from the inside of the wall, and are in the form of spaced elements around the interior of the wall. A bleed valve 52, 54 is provided substantially in the centre of each roof section 40, 42.

Near the top of the curved wall of each of the separation chambers 12, 14, an internal screw thread 32, 24 is provided. The internal screw threads 32, 34 correspond with external screw threads 36, 38 on the closure members 16, 18. Hence the closure members 16, 18 can be screwed into the top of the separation chambers 12, 14, to form a plug and seal the open end of the separation chambers.

A drain outlet is provided in the base of each separation chamber, and a drain plug 56 substantially in the form of a bolt is provided to close each drain outlet when the filter 10 is in use.

The fitment 60 comprises a first connector 62 and a second connector 64. In this embodiment the connectors 62, 64 are identical to each other, and are substantially in the form of 90 degree elbows. Each connector has a filter connection end 66 and a circuit connection end 68. The circuit connection ends 68 of each connector 62, 64 in use are connected into a central heating system circuit, and the filter connection ends 66 are connected to the magnetic filter 10, in particular to the inlet port arrangement 28 and the outlet port arrangement 30. As shown in FIG. 1, in use system water flows into the filter via the uppermost connector 62 (arrow A) and flows out of the filter via the lowermost connector 64 (arrow B).

Figure 4:
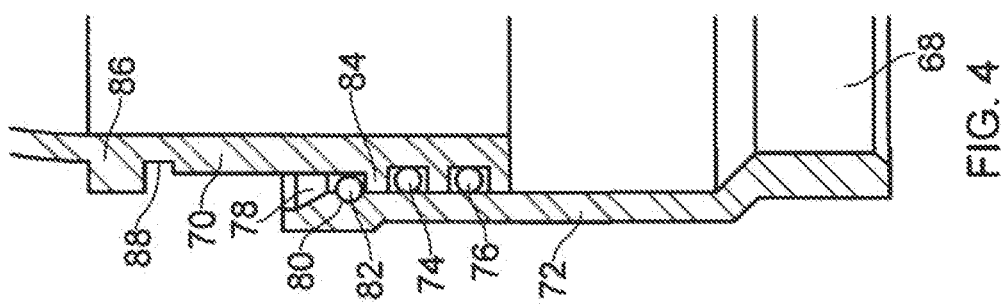

Referring now to FIGS. 3a, 3b, and 4, the fitment 60 will be described in more detail.

The filter connection end 66 of each connector 62, 64 is substantially identical to those disclosed in co-pending application GB1404432.5, and is not described in detail here. Briefly, the filter connection end includes a fitment adapted to be received within at least one of the ports of the separator, the fitment including a bore for carrying fluid from/to the central heating circuit to/from the separator, and a threaded connector for securing the fitment to the or each port, the threaded connector having a grip area for facilitating tightening of the connector by hand.

The circuit connection end 68 is telescopic, and so can be extended (as shown in FIG. 3a) and retracted (as shown in FIG. 3b) whilst maintaining a sealed flow path between the circuit connection end 68 and the filter connection end 66. The telescopic components are shown fully-extended in FIG. 3a, and fully retracted in FIG. 3b, but it will be appreciated that the fitment 60 can also work with the telescopic components in any intermediate position. Also, the telescopic parts of each connector 62, 64 could be equally extended, or have differing extents.

The telescopic circuit connection end 68 broadly includes an inner pipe 70 and an outer pipe 72. The outer pipe slides over the inner pipe to increase or decrease the total length of the circuit connection end 68. As seen best in FIG. 4, two O-ring seals 74, 76 are provided in grooves near the end of the inner pipe 70. The double seal ensures that fluid does not leak from the connector. The outer pipe has a tapered mouth 78, and a groove 80 just inward of the tapered mouth 78 which holds a snap-ring 82. The snap-ring 82 travels with the outer pipe 72 as it is moved (upwards and downwards in FIG. 4) with respect to the inner pipe 70. A first detent 84, in the form of a ring around the outside wall of the inner pipe, stops the mouth 78 of the outer pipe sliding over the O-ring seals 74, 76. The snap-ring 82 which is carried with the outer pipe 72 is obstructed by the first detent 84 when the telescopic parts are at maximum extension, preventing the parts coming apart or compromising the seal.

A second detent 86 is provided on the outside of the inner pipe 70, spaced some distance into the inner pipe 70 (i.e. towards the filter connection end). Adjacent to the second detent 86 and between the first and second detents 84, 86 is a snap-ring assembly groove 88. The snap-ring assembly groove is used when assembling the connector 64—the snap ring 82 can be placed around the inner pipe 70, between the first detent 84 and the assembly groove 88. The outer pipe 72 can then be pushed onto the inner pipe 70. As this is done, the snap-ring will travel in the mouth 78 of the outer pipe 72 until it reaches the assembly groove 88 and is obstructed from further travel along the pipe (upwards in FIG. 4) by the second detent 86. At this point, as the outer pipe 72 is pushed slightly further over the inner pipe, the increasingly narrow interior of the outer pipe 72 will compress the snap ring 82 into the groove 88, until the holding groove 80 of the outer pipe 72 is level with the snap ring 82. At this point, the snap ring 82 will snap into the holding groove 80, and the outer pipe 72 becomes permanently fixed to the inner pipe 70.

The outer pipe 72 is the part which is joined into the heating circuit. This may be via a screw connection in which case an interior thread may be cut into the end of the outer pipe 72, or it may be via a crimping system, or by any other means.

Figure 5:
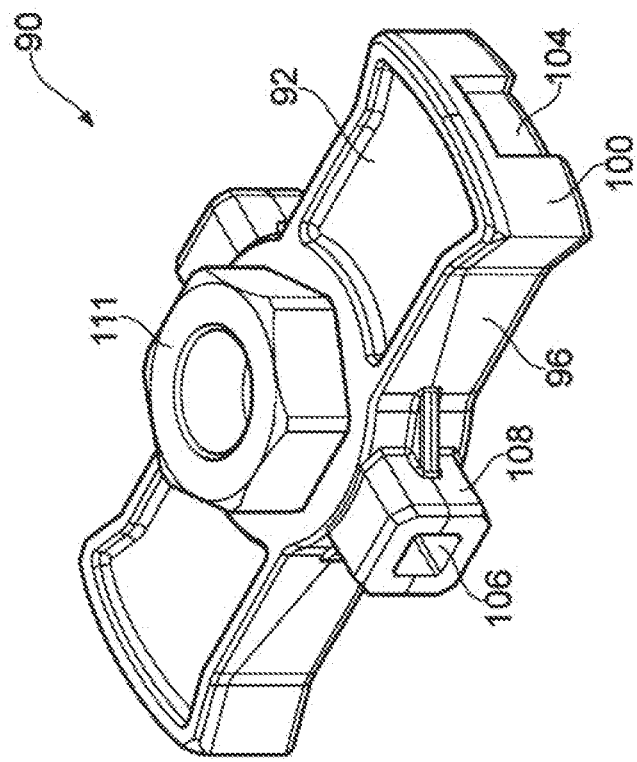
FIG. 5 is a perspective view of a handle member for use with the magnetic filter of FIG. 1.

Referring now to FIGS. 5, 6a and 6b, a handle member is indicated generally at 90. Note that although several handle members 90 are shown in FIGS. 6a and 6b, this is merely to show the handle 90 in different positions. It is envisaged that only one handle member 90 will be provided with each filter 10, since the handle 90 is a multipurpose tool.

The handle member 90 is substantially elongate, having upper, lower, left and right side faces 92, 94, 96, 98 and two opposing end faces 100, 102. The lower face 94, the right side face 98 and one of the end faces 102 are hidden in FIG. 5 but all faces are shown in at least one of the positions in FIGS. 6a and 6b. In any case, the left and right side faces 96, 98 are identical, as are the two opposing end faces 100, 102.

On each opposing end face 100, 102, a rectangular cut-out or indent 104 is provided. The cut out extends all the way to the edge of the end face 102, 104 which meets the lower face 94, but stops short of each of the other three edges of the end face 102, 104. The rectangular cut-out 104 on each end of the handle 90 is designed to engage with the radial castellations 48, 50 which are provided on the interior of the circumferential wall 44, 46 of each of the closures 16, 18. When the handle 90 is engaged, it sits at least partly below the top of the wall and castellations of the closure 16, 18, between opposing sides of the wall 44, 46. FIG. 6a shows the handle in position to be engaged with closure 16 in this way, indicated by arrow C.

A hexagonal male protrusion 111 is provided on the upper surface 92 of the handle 90, and is preferably sized at 22 mm across flats. The hexagonal male protrusion 111 can be engaged with a socket wrench or spanner which can then be used to apply torque to the handle, if required.

When the handle is positioned between opposing sides of the circumferential wall 44 of closure 16, it may be turned clockwise or anticlockwise to tighten or loosen the closure 16, as required. This can be done by band or by using a socket wrench or spanner as described above. Indeed, using any other tool is difficult. This is an advantage, because where closures can be gripped by large spanners or the like, over-tightening is a risk and can lead to damage to the plastic separation chamber, and to the seal of the closure on the separation chamber. The handle generally allows tightening and loosening of the closure 16 by hand, but over time the closure may become tighter and more difficult to loosen by hand. In that case, a socket wrench or spanner may be used. However, the arrangement of the handle assembly provides a practical limitation as to the types of tools which may be used, therefore reducing the risk of damage caused by over-torquing.

On each side face 96, 98 of the handle member 90, a square socket 106 is provided within a substantially square extension 108. The square socket is sized to operate bleed valve 52, and also other bleed valves which are typically found on most radiators and other central heating system components. The handle 90 is seen in the correct position to operate the bleed valve 52 in FIG. 6a, indicated by arrow D.

Two identical hexagonal sockets 110 are provided in the lower face 94 of the handle 90. These are best seen in FIG. 6a on the handle 90 indicated by arrow E. The sockets are disposed at either side of a circular indent 112 which is substantially in the centre of the lower face 94.

The hexagonal sockets 110 allow the handle to be used as a spanner to operate the bolt 56 which forms the drain plug on the separator chamber 14, as shown in FIG. 6b, indicated by arrow F.

Figure 7:
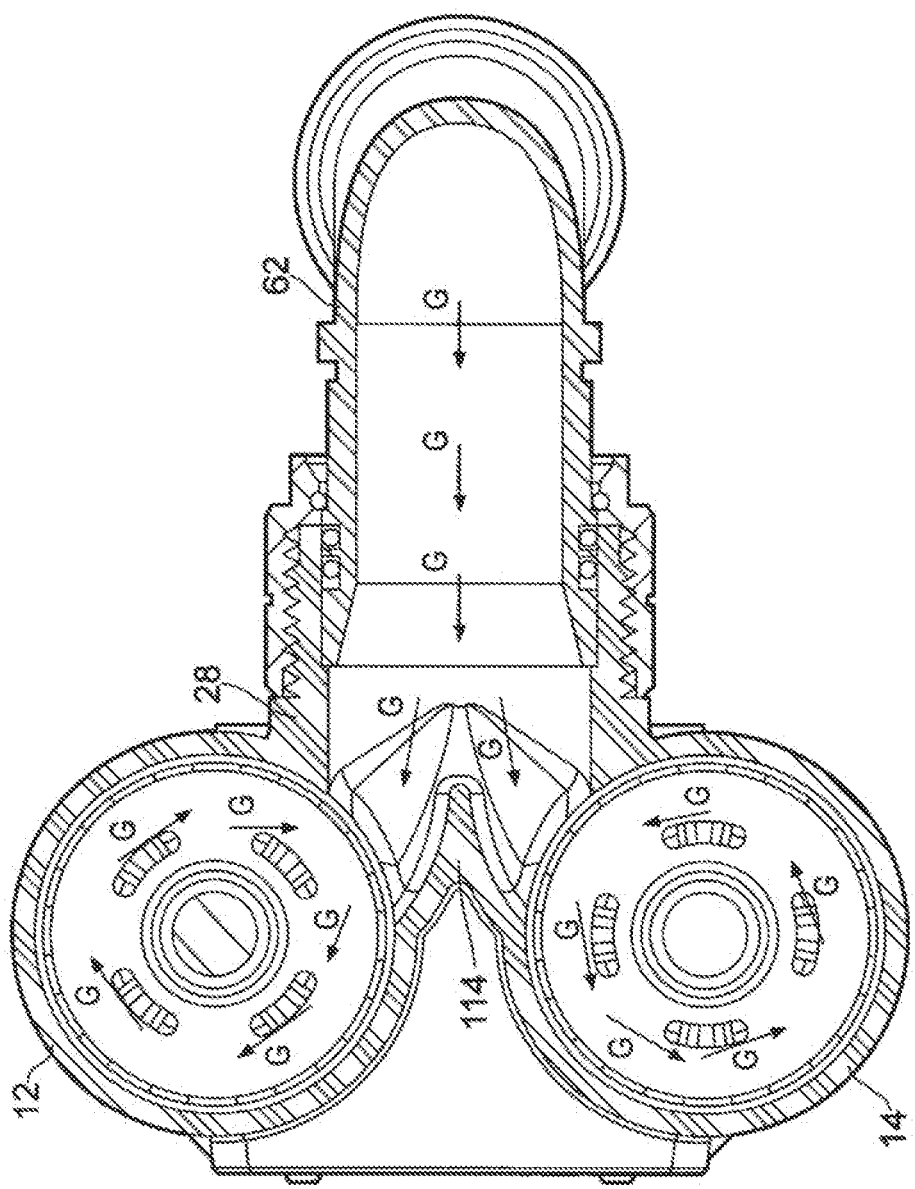
FIG. 7 is a cross-section through the magnetic filter and fitment of FIG. 1, showing the direction of flow within the fitment and filter.

Referring now to FIG. 7, the construction of the inlet arrangement 28 will be described in more detail. The flow path within the outlet arrangement is substantially Y-shaped, the flow from the inlet connector 62 through the inlet port being split into two, part of the flow being directed into each of the first and second separation chambers 12, 14. The inlet arrangement 28 is fluidly connected with each separation chamber 12, 14 through an aperture in the curved wall of the cylindrical separation chamber, and the flow enters the separation chamber substantially parallel to the curved wall, at the point where the curved wall meets the inlet arrangement 28. In other words, flow enters each separation chamber at a tangent. As a result, a swirl of flow is created in each of the two chambers 12, 14, as indicated by arrows G.

The outlet arrangement 30 is not seen in the cross-section of FIG. 7, but it is substantially identical and, in fact, either port can be used as the inlet, with the other port being used as the outlet. Note that the flow deflector 114 which defines the centre of the Y-shaped flow path in each inlet/outlet arrangement 28, 30 has a curved profile in the plane defined by a circular section of the cylinder—i.e. the plane in which the cross section of FIG. 7 is shown. This reduces pressure drop which would otherwise be caused at the outlet when the flow has to turn a sharp corner into the substantially tangential outlet arrangement 30. It is found that, with this size of filter, this arrangement gives acceptable results in terms of pressure drop.

The filter and fitment provides for a high-performance and economical filter which is useful in systems where a typical domestic filter would be too small, and where a known commercial filter would be over-specified and unnecessarily expensive. The filter can be made from plastics, in particular glass-reinforced nylon or glass-reinforced polypropylene, but safeguards are provided against overtightening which can otherwise be a problem with plastic filters of this size. The fitment arrangement allows easy fitting to inflexible pipework.

The embodiments described above are provided by way of example only, and various changes and modifications will be apparent to persons skilled in the art without departing from the scope of the present invention as defined by the appended claims.

We claim:

1. A magnetic filter for a central heating system, in combination with a handle member, the magnetic filter including at least one separation chamber and a screw-top closure for closing an opening in the at least one separation chamber, the screw-top closure having a circumferential wall, the circumferential wall including an interior side defining an area on the screw-top closure for receiving the handle member, and the circumferential wall being provided with castellations around the interior side of the circumferential wall for engaging with the handle member, the handle member being placeable across the screw-top closure to enable turning of the screw-top closure, said placement being between first and second opposing sides of the interior side of the circumferential wall, the handle member being in the form of an elongate body having two opposing end faces, and castellation engagement means on each end face which are together releasably engageable with the castellations on the opposing sides of the interior side of the circumferential wall of the screw-top closure, wherein the handle member is releasably engageable with the interior side of the circumferential wall whilst the screw-top closure keeps the opening of the separation chamber closed.

2. A magnetic filter in combination with a handle member as claimed in claim 1, in which the at least one separation chamber is made from plastics or glass-reinforced nylon or glass-reinforced polypropylene.

3. A magnetic filter in combination with a handle member as claimed in claim 1, in which an exterior thread is provided on an outside of the circumferential wall, opposite the castellations.

4. A magnetic filter in combination with a handle member as claimed in claim 3, in which the exterior thread extends to a top of the circumferential wall.

5. A magnetic filter as claimed in claim 1, in which a lip is provided on the screw-top closure, the lip extending outwardly from a top of the circumferential wall.

6. A magnetic filter in combination with a handle member as claimed in claim 1, in which a positioning aid is provided at a center of the screw-top closure, extending from the screw-top closure in a same direction as the circumferential wall.

7. A magnetic filter in combination with a handle member as claimed in claim 6, in which the positioning aid is a circular protrusion, for engaging with a corresponding circular indent in the handle member.

8. A magnetic filter in combination with a handle member as claimed in claim 6, in which the positioning aid is part of a bleed valve.

9. A magnetic filter in combination with a handle member as claimed in claim 1, in which the castellations are provided equally spaced, all the way around the interior side of the circumferential wall.

10. A magnetic filter in combination with a handle member as claimed in claim 1, in which the castellation engagement means are in the form of rectangular cut-outs in each end face of the handle member, the rectangular cut-outs extending to at least one edge of each respective end face, each rectangular cut-out being positionable over the castellation on the interior side of the circumferential wall.

11. A magnetic filter in combination with a handle member as claimed in claim 1, in which the handle member has a top side and a bottom side, and the handle member includes an indent at a center of one of the top side and the bottom side, which is fittable over a positioning aid when the handle member is engaged with the screw-top closure.

12. A magnetic filter in combination with a handle member as claimed in claim 1, in which the handle member has a top side and a bottom side, and a socket for engaging a nut or bolt head is provided on one of the top side or the bottom side of the handle member.

13. A magnetic filter in combination with a handle member as claimed in in claim 12, in which the magnetic filter is provided with a drain valve on a bottom end of the at least one separation chamber, and the drain valve is closed by a drain plug in the form of a bolt which is sized to be operated by engaging the socket of the handle member.

14. A magnetic filter in combination with a handle member as claimed in claim 1, in which the handle member has a top side and a bottom side, and the handle member has a left side face and a right side face, the left side face and the right side face extending between the top side and the bottom side and also between the two end faces, and in which a further socket is provided on at least one of the left side face and the right side face.

15. A magnetic filter in combination with a handle member as claimed in claim 14, in which a positioning aid is provided at a center of the screw-top closure, extending from the screw-top closure in a same direction as the circumferential wall, the positioning aid is part of a bleed valve, wherein the bleed valve is provided on the screw-top closure, and the further socket on the handle member is sized to operate the bleed valve.

16. A magnetic filter in combination with a handle member as claimed in claim 1, in which:
   in a first configuration, the handle member is engageable with the screw-top closure engaging the castellations on the opposing sides of the interior side of the circumferential wall;
   in a second configuration, the handle member is disengaged from the screw-top closure and spaced from the screw-top closure; and
   neither, one, or both of:
      in a third configuration, the handle member is engageable with a bleed valve provided on the screw-top closure, and not with the castellations, for operating the bleed valve without turning the screw-top closure; and
      in a fourth configuration, the handle member is engageable with a drain valve on a bottom end of the at least one separation chamber, the drain valve being closed by a drain plug in the form of a bolt which is sized to be operated by engaging a socket of the handle member.

17. A magnetic filter in combination with a handle member as claimed in claim 1, in which, when the handle member is engaged with the castellations on the screw-top closure, part of the handle member sits on top of the castellations.

18. A magnetic filter in combination with a handle member as claimed in claim 1, in which the handle member has a top side, a bottom side, a left side face and a right side face, the left side face and the right side face extending between the top side and the bottom side and also between the two opposing end faces, and, when the handle member is engaged with the castellations on the screw-top closure, the left and right side faces of the handle member are spaced from the interior side of the circumferential wall.

19. A magnetic filter in combination with a handle member as claimed in claim 1, in, when the handle member is engaged with the screw-top closure, part of the handle member extends to a first position between first and second adjacent castellations on the first opposing side of the interior side of the circumferential wall, and part of the handle member extends to a second position between first and second adjacent castellations on the second opposing side of the interior side of the circumferential wall, to enable turning of the handle member to turn the screw-top closure.

20. A magnetic filter for a central heating system, in combination with a handle member, the magnetic filter including at least one separation chamber and a screw-top closure for closing an opening in the at least one separation chamber, the screw-top closure having a circumferential wall, the circumferential wall including an interior side defining an area on the screw-top closure for receiving the handle member, and the circumferential wall being provided with castellations around the interior side of the circumferential wall for engaging with the handle member, the handle member being placeable across the screw-top closure to enable turning of the screw-top closure, said placement being between first and second opposing sides of the interior side of the circumferential wall, the handle member being in the form of an elongate body having two opposing end faces, and screw-top closure engagement means on each end face which are together releasably engageable with the castellations on the opposing sides of the interior side of the circumferential wall of the screw-top closure, wherein in a first configuration, the handle member is engageable with the screw-top closure engaging the castellations on the opposing sides of the interior side of the circumferential wall;

in a second configuration, the handle member is disengaged from the screw-top closure and spaced from the screw-top closure, whilst the screw-top closure keeps the opening of the separation chamber closed; and neither, one, or both of:

in a third configuration, the handle member is engageable with a bleed valve provided on the screw-top closure, and not with the castellations, for operating the bleed valve without turning the screw-top closure; and in a fourth configuration, the handle member is engageable with a drain valve on a bottom end of the at least one separation chamber, the screw-top closure being provided at a top end of the at least one separation chamber, the drain valve being closed by a drain plug in the form of a bolt which is sized to be operated by engaging a socket of the handle member.

* * * * *